July 7, 1964  D. S. STRADER  3,139,908
VALVE FOR HYDRAULICALLY OPERATED CLUTCHES
Filed Nov. 20, 1961
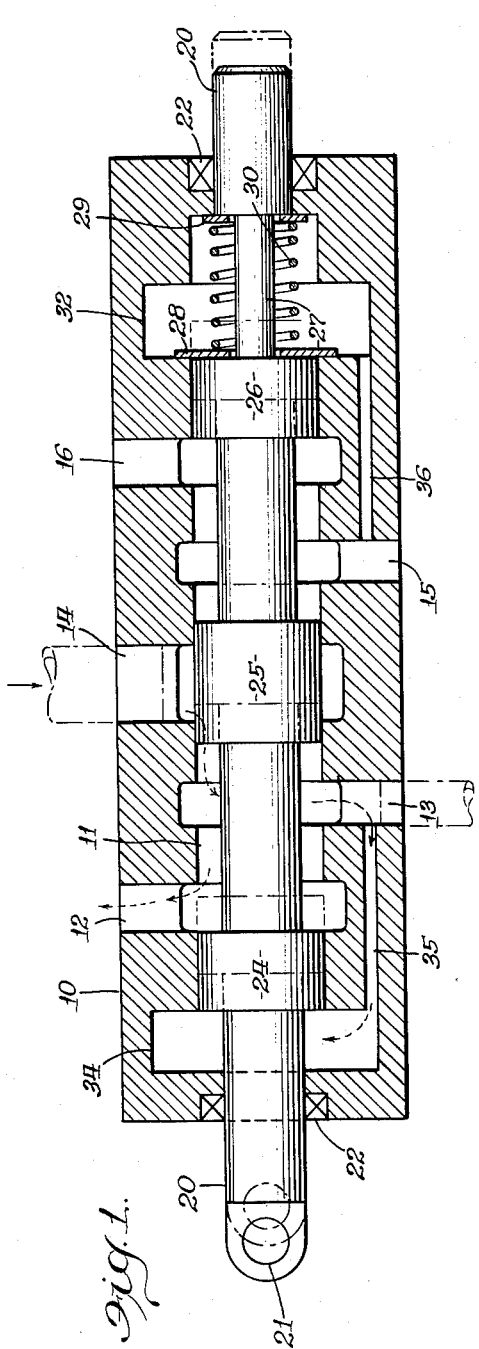
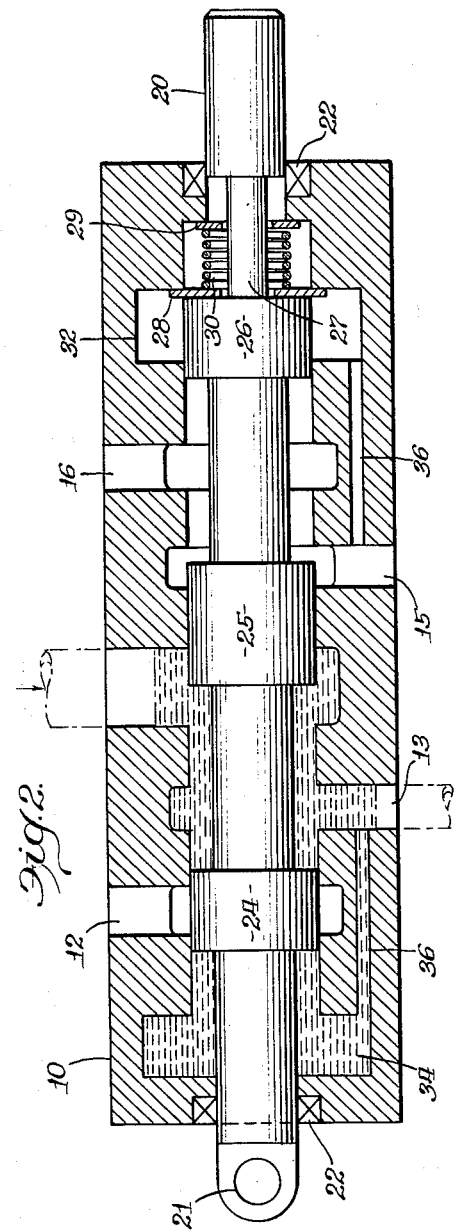
INVENTOR.
Don S. Strader
BY Paul O. Pippel
Atty.

United States Patent Office 3,139,908
Patented July 7, 1964

3,139,908
VALVE FOR HYDRAULICALLY OPERATED
CLUTCHES
Don S. Strader, Mount Prospect, Ill., assignor to The
Frank G. Hough Co., a corporation of Illinois
Filed Nov. 20, 1961, Ser. No. 153,326
2 Claims. (Cl. 137—625.48)

This invention relates generally to valve constructions for hydraulically operated clutches, and more particularly to a valve construction for lubricating and operating a pair of hydraulically operated clutches.

The primary object of the present invention is to provide a novel control valve for a hydraulically operated clutch which will initially deliver hydraulic fluid to the clutch for lubrication thereof.

It is a further object of the present invention to provide a unique valve arrangement for a hydraulically operated clutch which will upon the initial operation of and the initial disengagement of the clutch deliver fluid to the clutch for lubrication purposes.

It is a further object of the present invention to provide a valve arrangement for operating a hydraulically operated clutch wherein the valve is manually operated to initially deliver fluid to the clutch for lubrication thereof before the operation thereof and wherein hydraulic fluid is applied to the valve to maintain the valve operated only as long as sufficient hydraulic fluid pressure is delivered to the valve to insure proper operation of the clutch connected thereto.

Still another object of the present invention is to provide a simple valve alternately controlling the operation of a pair of hydraulically operated clutches with means in the valve for delivering fluid for lubrication purposes to either one of the clutches upon the initial operation thereof and upon the initial disengagement theerof and with means in the valve for maintaining the valve operated to either of the two operated positions thereof.

Other objects and features of the invention will be apparent upon a perusal of the following specification and drawing in which:

FIGURE 1 is a cross sectional view of a valve constructed according to the present invention with the valve spool in the center neutral position; and FIGURE 2 is a view similar to FIGURE 1 but with the valve spool in one extreme operated position.

The present embodiment is the preferred embodiment, but it is to be understood that changes can be made in the present embodiment by one skilled in the art without departing from the spirit and scope of the present invention.

Generally, the valve of the present invention comprises a valve body having a pressure port, a pair of clutch operating ports, and a pair of clutch lubricating ports, one clutch operating port and one clutch lubricating port being connectable to a hydraulically operated and lubricated clutch. It is intended that the present invention be applied to hydraulically operated clutches of the type wherein the clutches only require lubrication during the engagement and disengagement thereof. A valve spool is slidably carried for reciprocating movement in the valve body and is biased to a center neutral position by a coiled spring. The valve spool may be manually moved against the bias of the coiled spring in either direction from the center neutral position to alternately operate either one or the other of a pair of hydraulically operated clutches. When the valve spool is moved in one direction from the center neutral position to operate one of the clutches, the valve spool upon initially clearing the pressure port will cause the hydraulic fluid from the pressure port to be delivered to the lubrication port for that clutch. Further movement of the clutch in the same direction will block the lubrication port thereby permitting full pressure to build up at the clutch operating port. The valve is further constructed so that the pressure applied to operate the clutch is also applied to one end of the valve spool to maintain the valve fully operated. When the valve spool is moved from one of the operated positions to the center neutral position, the lubrication port for the operated clutch will again be opened upon the initial movement of the valve spool toward the center neutral position to provide for lubrication of the clutch upon the disengagement or restoration thereof. When the valve spool reaches the center neutral position, the pressure port will again be blocked and the coiled spring in the valve will maintain the valve biased to the center neutral position. In the center neutral position no hydraulic fluid pressure is applied to either end of the valve spool or to the lubricating ports. Either direction of movement of the valve spool from the center neutral position will cause the lubrication and operation of one of the clutches in the manner described above. The advantage of the maintenance of the spool in either operated position thereof by the hydraulic fluid under pressure delivered from the pressure port to one end of the valve spool is noteworthy when consideration is given to various clutch constructions which are subject to serious damage should the operating pressure accidentally drop to a value permitting slippage of the clutch. In the present invention the coiled spring which biases the valve to the center neutral position is selected as one which will return the spool to the center neutral position should the pressure at either end of the valve spool, maintaining the valve spool operated, drop below that pressure which is necessary to keep either of the clutches from slipping. Thus upon an accidental drop in fluid pressure at the pressure or operating ports, the valve is automatically returned to the neutral position disengaging the operated clutch and thereby preventing any damage to the clutch.

In detail, the valve of the present invention comprises a valve body 10 having a valve bore 11 formed therein. The valve body 10 is further provided with fire ports 12, 13, 14, 15 and 16 which are connected into the valve bore 11 in a spaced apart relationship to each other longitudinally of the valve bore 11. It is intended that the port 12 be connected to a lubricating line for one clutch, and the port 13 be connected to the operating line or conduit for that one clutch. It is intended that the port 14 be connected to a source of hydraulic fluid under pressure. It is further intended that the port 15 be connected to the operating line for a second hydraulically operated clutch, and that the port 16 be connected to the lubricating line for the second hydraulically operated clutch.

A valve spool 20 is carried in the valve bore 11 for longitudinal reciprocating movement therein. The valve spool 20 extends outwardly from the ends of the valve body, and one end of the valve spool 20 is provided with a hole 21 for the connection of some manually operated lever arrangement (not shown) thereto. It is intended that any leverage arrangement connected through the hole 21 to the valve spool 20 be such that upon the manual application of a force moving the valve spool 20 to one of the extreme operated positions in each direction from the center neutral position, no further substantial manual or mechanical force be applied to the valve spool 20 to maintain it in either one of the operated positions thereof. The reason for this arrangement is to permit the valve spool 20 to be automatically returned to the normal center neutral position should there be a failure of hydraulic fluid pressure at the valve.

Any suitable fluid seals 22 are provided one at each end of the valve body 10 and about the extending end portions of the valve spool 20 to prevent any leakage of hydraulic fluid from the valve bore 11 and about the surface of the extending end portions of the valve spool 20.

The valve spool 20 further comprises three lands 24, 25 and 26, and a reduced portion 27. The reduced portion 27 provides radially extending wall portions at each end thereof functioning as shoulders to retain the spring biasing means for the valve. The spring biasing means comprises a pair of washers 28 and 29 and a coiled spring 30. The washer 28 has an inner diameter larger than the diameter of the reduced portion 27 of the valve spool 20, and an outer diameter greater than the diameter of the valve bore 11 and less than the diameter of an annular groove 32 formed in the valve body 10 adjacent one end of the valve bore 11. The washer 29 has an inner diameter greater than the diameter of the reduced portion 27 of the valve spool 20 and an outer diameter greater than the diameter of the valve spool 20 but less than the diameter of the valve bore 11. The coiled spring 30 has a diameter greater than the inner diameter of the washers 28 and 29 and is positioned between the washers 28 and 29 in a compressed condition to bias the washers 28 and 29 apart with a certain force. The washers 28 and 29 cooperate with the shoulders at each end of the reduced section 27, and the annular groove 32, and the valve bore 11 to bias the valve spool 20 to the center neutral position under the influence of the compressed coiled spring 30. If the end of the valve 20 having the hole 21 is moved inwardly of the valve body 10, the washer 28 will be moved toward washer 29 causing a further compression of the coiled spring 30. If the valve spool 20 is moved in the opposite direction, the washer 29 will be carried by the valve spool 20, toward the washer 28 further compressing the coiled spring 30.

The lands 24, 25 and 26 of the valve spool 20 are positioned thereon in a spaced apart relationship to each other so that in the center neutral position of the valve spool 20, the land 24 is positioned between the port 12, and an annular groove 34 formed in the valve body 10 at the opposite end of the valve bore 11 from the annular groove 32, the land 25 is positioned between ports 13 and 15 and in a blocking relationship to port 14, and the land 26 is positioned between port 16 and the annular groove 32.

The valve of the present invention further includes a passageway 35 connected between port 13 and annular groove 34, and a passageway 36 connected between port 15 and annular groove 32.

In describing the operation of the valve of the present invention it may be assumed that a clutch connected to ports 12 and 13 is to be operated. In the center neutral position, no hydraulic fluid is delivered to any of the ports 12, 13, 15 or 16 since the land 25 is then positioned to block the hydraulic fluid pressure port 14. As the valve spool 20 is manually moved from the neutral center position in a direction wherein the end thereof having the hole 21 is moved inwardly the valve body 10, the first occurrence will be an unblocking of the pressure port 14 by the land 25 and a partial blocking of the port 12 by the land 24. Hydraulic fluid under pressure may then flow from port 14 through the valve bore 11 to the lubrication port 12, the clutch operating port 13, and through passageway 35 to the annular groove 34. As the described movement of the valve spool is continued, the land 24 will block lubricating port 12 thereby completing the lubrication of the clutch and permitting the development of full hydraulic fluid pressure at the clutch operating port 13 to cause operation of the clutch. As the pressure rises to the value necessary to operate the clutch, that pressure will also be applied through passageway 35 and annular groove 34 to the side wall of the land 24 in a direction tending to further move the valve spool 20 in the described direction until the washer 28 engages the opposite side of the annular groove 32 as shown in FIGURE 2. The clutch will then be maintained operated to the position of FIGURE 2 by the hydraulic fluid under pressure in annular groove 34 acting against the land 24. The spring 30 is selected as one which will in an operated position of the valve, as in FIGURE 2, apply a force to the valve spool 20 of an amount substantially equal to the force represented by the pressure in annular groove 34 multiplied by the area of the side of the land 24 wherein that hydraulic pressure is at least equal to the minimum pressure necessary at port 13 to prevent slippage of the clutch connected to port 13.

To restore or disengage the clutch, the valve spool 20 at the end having the hole 21 must be manually moved outwardly of the valve body 10 to return the valve spool 20 to the center neutral position. Upon the initial movement of the valve spool 20 in that direction, the lubricating port 12 will be unblocked by the land 24 and the clutch will be supplied with lubricating fluid until the land 25 again blocks the pressure port 14 in the center neutral position of the valve.

It is also pointed out in view of the foregoing described operation that the size of the passageway 35 determines the rate of flow of the fluid volume to and from annular groove 34. Thus the rate of flow determines the speed of the spool 11, and in turn, speed of clutch engagement or disengagement and the amount of fluid through lubricating passage 12.

It is apparent from the foregoing description of the construction of the valve and the operation thereof in one direction, that the valve spool 20 may be moved from the center neutral position in the opposite direction to cause a corresponding lubrication and operation of any clutch connected to ports 15 and 16.

Having described the invention, what is considered new and desired to be protected by Letters Patent is:

1. A control valve for alternate operation of a pair of hydraulically operated clutches which require lubrication only during engagement and disengagement thereof and which require a minimum hydraulic pressure for satisfactory operation, comprising: a valve body having a valve bore formed therein, a pressure port, a pair of clutch operating ports, a pair of clutch lubricating ports, said pressure port connected through said valve body into said valve bore substantially longitudinally centrally thereof, said lubricating ports connected through said valve body into said valve bore in a longitudinal spaced relationship one on each side of said pressure port, each of said operating ports connected through said valve body into said valve bore between said pressure port and one of said lubricating ports, a valve spool slidably carried in said valve bore for reciprocating movement therein longitudinally of the valve bore, three lands formed on said valve spool in a spaced-apart relationship to each other so that one lubricating port and one operating port of said pairs of lubricating ports and operating ports are positioned between the center land and one of the other lands when said center land blocks said pressure port in the center neutral position of said valve spool, said lands being spaced apart so that upon the initial movement of said valve spool in either direction from said center neutral position said pressure port is unblocked by said center land before one of the other of said lands block one of said lubricating ports and so that further movement of said valve spool in the direction of initial movement thereof causes said one of the other of said lands to block said one of said lubricating ports whereby said pressure port and one of said operating ports are connected in free fluid communication through said valve bore and between said center land and said one of the other of said lands, passageway means providing communication between each of said operating ports and the opposite ends of said valve bore, said opposite ends of said valve bore being formed to have annular grooves communicating with said passageway means, and spring biasing means carried in said valve body and cooperating with said valve spool to bias said spool to said center neutral position wherein said center land blocks said pressure port, said spring bias means having a biasing force equal to the hydraulic force exerted on said one of the other of said lands by said minimum hydraulic pressure whereby when said operating pressure drops below the required minimum said spool will be returned to said center neutral position.

2. A control valve according to claim 1 wherein said passageway means has a diameter smaller than the diameter of said bore whereby when said spool is returned to said center neutral position said passageway will restrict the flow of fluid from said bore and thereby control the movement of said spool.

References Cited in the file of this patent

UNITED STATES PATENTS

| 2,290,832 | Flygare | July 21, 1942 |
| 2,410,404 | Buchanan | Nov. 5, 1946 |

FOREIGN PATENTS

| 405,386 | Italy | of 1943 |